United States Patent
Muraleedharan et al.

(10) Patent No.: US 10,055,368 B2
(45) Date of Patent: Aug. 21, 2018

(54) MOBILE DEVICE AND METHOD FOR SYNCHRONIZING USE OF THE MOBILE DEVICE'S COMMUNICATIONS PORT AMONG A PLURALITY OF APPLICATIONS

(71) Applicant: SanDisk Technologies Inc., Plano, TX (US)

(72) Inventors: Anurag Chelamchirayil Muraleedharan, Santa Clara, CA (US); Eyal Hakoun, Sunnyvale, CA (US)

(73) Assignee: SanDisk Technologies LLC, Plano, TX (US)

( * ) Notice: Subject to any disclaimer, the term of this patent is extended or adjusted under 35 U.S.C. 154(b) by 415 days.

(21) Appl. No.: 15/059,000

(22) Filed: Mar. 2, 2016

(65) Prior Publication Data
US 2017/0249267 A1    Aug. 31, 2017

Related U.S. Application Data

(60) Provisional application No. 62/300,546, filed on Feb. 26, 2016.

(51) Int. Cl.
*G06F 13/24* (2006.01)
*H04M 1/725* (2006.01)
*G06F 13/00* (2006.01)

(52) U.S. Cl.
CPC ........ *G06F 13/24* (2013.01); *H04M 1/72583* (2013.01)

(58) Field of Classification Search
CPC ............................... G06F 13/24; H04M 1/738
USPC .......................................................... 710/263
See application file for complete search history.

(56) References Cited

U.S. PATENT DOCUMENTS

| | | | | |
|---|---|---|---|---|
| 5,418,909 A * | 5/1995 | Jackowski | ............ | G06F 13/126 710/15 |
| 5,781,800 A * | 7/1998 | Koyama | ............ | G06F 13/126 710/40 |
| 6,681,270 B1 * | 1/2004 | Agarwala | ............ | G06F 13/387 710/33 |
| 7,346,909 B1 * | 3/2008 | Eldar | ............ | H04L 29/12924 709/202 |
| 8,639,733 B2 * | 1/2014 | Holden | ............ | G06F 13/385 707/827 |

(Continued)

OTHER PUBLICATIONS

"SanDisk iXpand Flash Drive for IPhone and IPad", printed from the Internet at https://www.sandisk.com/home/mobile-device-storage/ixpand dated Feb. 23, 2016, 12 pgs.

*Primary Examiner* — Christopher Shin
(74) *Attorney, Agent, or Firm* — Brinks Gilson & Lione

(57) ABSTRACT

A mobile device and method for synchronizing use of the mobile device's communications port among a plurality of applications are provided. In one embodiment, a mobile device is provided comprising a communications port configured to connect with a mobile device accessory and a processor. The processor is configured to synchronize requests from a plurality of applications running on the mobile device to prevent application(s) from sending a request that would interrupt an ongoing data transfer between the mobile device accessory and another application. Other embodiments are possible, and each of the embodiments can be used alone or together in combination.

20 Claims, 8 Drawing Sheets

(56) References Cited

U.S. PATENT DOCUMENTS

| | | | |
|---|---|---|---|
| 2003/0158980 A1* | 8/2003 | Mizuno | G06F 3/0613 |
| | | | 710/36 |
| 2007/0282959 A1* | 12/2007 | Stern | G06Q 30/02 |
| | | | 709/206 |
| 2008/0104126 A1* | 5/2008 | Martinez-Perez | |
| | | | G06F 17/30017 |
| 2011/0167176 A1* | 7/2011 | Yew | G06F 13/385 |
| | | | 710/6 |
| 2011/0185047 A1* | 7/2011 | Vaidyanathan | G06F 11/1464 |
| | | | 709/220 |
| 2012/0017017 A1* | 1/2012 | Nishiyashiki | G06F 13/36 |
| | | | 710/242 |
| 2012/0191880 A1* | 7/2012 | Gandhi | G06F 13/385 |
| | | | 710/16 |
| 2014/0317303 A1* | 10/2014 | Toprani | H04L 65/1003 |
| | | | 709/227 |

* cited by examiner

MOBILE DEVICE AND METHOD FOR SYNCHRONIZING USE OF THE MOBILE DEVICE'S COMMUNICATIONS PORT AMONG A PLURALITY OF APPLICATIONS

CROSS-REFERENCE TO RELATED APPLICATION

This application claims the benefit of U.S. Provisional Patent Application No. 62/300,546, filed Feb. 26, 2016, which is hereby incorporated by reference.

BACKGROUND

Many modern mobile devices have a communications port that is configured to connect with a mobile device accessory. For example, the current version of Apple's iPhone has a Lightning connector that can be used to connect to a Made-for-iPhone ("MFi") accessory. One such accessory is the iXpand Flash Drive by SanDisk®. The iXpand™ Flash Drive is a portable memory device that has a Lightning connector that plugs-in to the Lightning connector port on an iPhone. After the iXpand™ Flash Drive is plugged-in to the iPhone, the processor on the iPhone can use the iXpand™ Flash Drive as an external storage device, so that data (e.g., photos, videos, music, documents, etc.) can be transferred between the iPhone and the external storage device. It should be noted that the iPhone, Lightning connector, and the iXpand™ Flash Drive are just examples of a mobile device, communications port, and mobile device accessory. Devices and accessories by other manufactures (e.g., Samsung), as well as different types of communications ports, can be used.

DETAILED DESCRIPTION

By way of introduction, the below embodiments relate to a mobile device and method for synchronizing use of the mobile device's communications port among a plurality of applications.

In one embodiment, a mobile device is provided comprising a communications port configured to connect with a mobile device accessory and a processor. The processor is configured to synchronize requests from a plurality of applications running on the mobile device to prevent application(s) from sending a request that would interrupt an ongoing data transfer between the mobile device accessory and another application.

In some embodiments, the plurality of applications cannot directly communicate with each other regarding use of the communications port, and wherein the plurality of applications indirectly communicate with each other regarding use of the communications port via an operating system level application program interface of the mobile device.

In some embodiments, the processor is configured to synchronize requests using an application layer queue running on each of the plurality of applications.

In some embodiments, the mobile device accessory comprises an external storage device.

In some embodiments, the mobile device accessory comprises at three-dimensional memory.

In some embodiments, the mobile device comprises a smart phone.

In some embodiments, the communications port is a wired port.

In some embodiments, the communications port is a wireless port.

Other embodiments are possible, and each of the embodiments can be used alone or together in combination.

Figure 1:
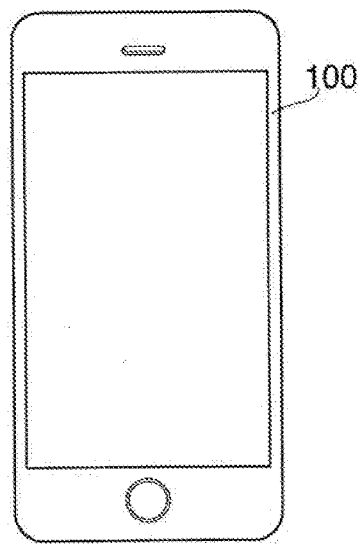
FIG. 1 is an illustration of a mobile device of an embodiment.

Turning now to the drawings, FIG. 1 is an illustration of a mobile device 100 of an embodiment. The mobile device 100 can take any suitable form, such as, but not limited to, a smart phone (e.g., an Apple iPhone, an Android phone), a tablet (e.g., an Apple iPad), a "phablet," a book reader (e.g., an Amazon Kindle), a digital media player (e.g., an iPod), a game device, a personal digital assistant (PDA), a laptop, a wearable computer (e.g., a smart watch or Google Glasses), and any other mobile device that uses a communications port to communicate with a mobile device accessory. Although the mobile device in the following embodiments will be take the form of an Apple iPhone, it should be understood that this is merely an example and should not be read into the claims.

Figure 2:
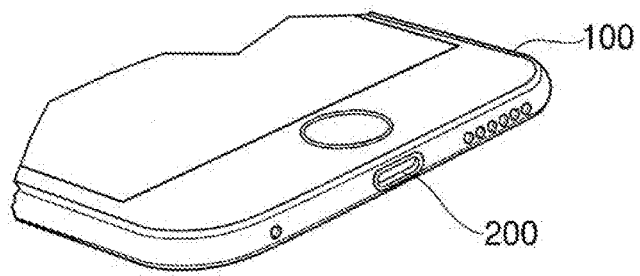
FIG. 2 is an illustrations of a bottom surface of a mobile device of an embodiment showing the mobile device's communications port.
Figure 3:
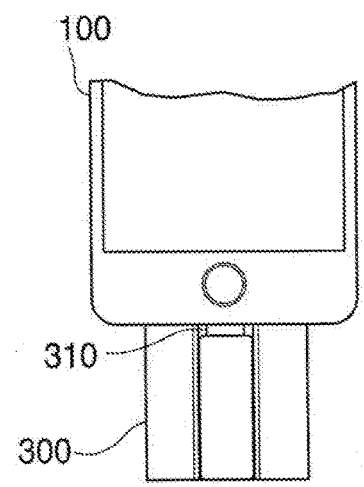
FIG. 3 is an illustration of a mobile device of an embodiment, in which a mobile device accessory is plugged-in to the mobile device's communications port.

FIG. 2 shows the bottom surface of the mobile device 100. In this embodiment, the bottom surface of the mobile device 100 contains a communications port 200. As used herein, a communications port is an interface through which data (and sometimes power) is transferred between the mobile device 100 and other device, such as a mobile device accessory 300 (see FIG. 3). As shown in FIG. 3, a mobile device accessory 300 that has a male connector 310 can plug-in to the mobile device's communications port 200. In this example, the mobile device accessory 300 is an iXpand Flash Drive by SanDisk®. The iXpand™ Flash Drive is a portable memory device that serves as additional memory storage for the mobile device 100, so data (e.g., photos, videos, music, documents, etc.) can be transferred between the mobile device 100 and the iXpand™ Flash Drive. Of course, the iXpand™ Flash Drive is just one example of a mobile device accessory 300 and should not be read into the claims. Other types of mobile device accessories can be used, such as, but not limited to, external storage devices from other manufacturers, a detachable external battery, and a mobile device case that connects with the communications port.

In this particular example, the communications port 200 takes the form of a Lightning connector port, which contains eight pins that serves both as a data bus and as a power connector. Of course, a Lightning connector port is just one example of a communications port 200 and should not be read into the claims. Other types of communications ports can be used, such as, but not limited to, a communications port with a different form factor (e.g., a micro-USB port), a communications port that is located on another surface of the mobile device 100, and a communications port that uses use wireless communication (instead of a wired connector) to communicate with the mobile device accessory. As used herein, the phrase "in communication with" could mean directly in communication with or indirectly in communication with through one or more components, which may or may not be shown or described herein.

Figure 4:
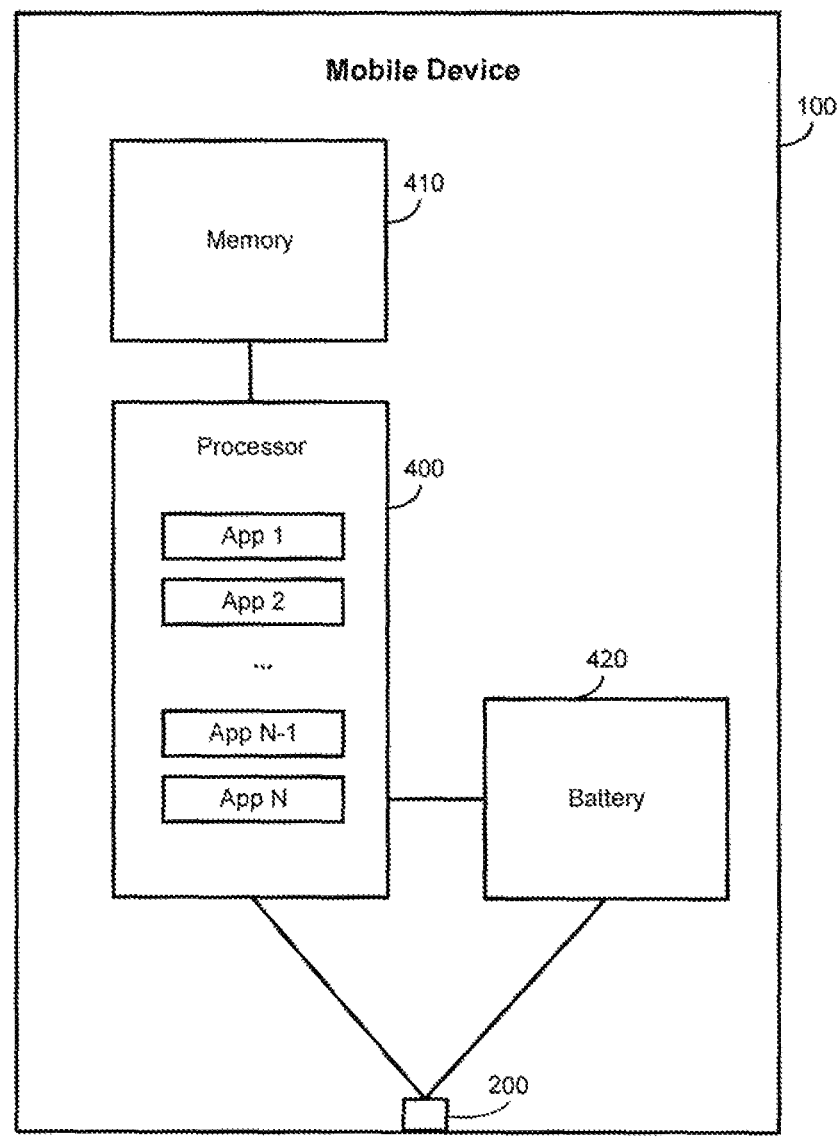
FIG. 4 is a block diagram of a mobile device of an embodiment.

Returning to the drawings, FIG. 4 is a block diagram of a mobile device 100 of an embodiment. As shown in FIG. 4, the mobile device 100 of this embodiment comprises a processor 400 (sometimes referred to as a "controller") running a plurality of applications ("apps"), a memory 410, and a battery 420. An application can be computer-readable program code that is initially stored in memory 410 and later read and executed by the processor 400. In one embodiment, the memory 410 is embedded in the mobile device 100, while, in other embodiments, the memory 410 is removably connected to the mobile device 100 (e.g., when the memory 410 takes the form of a removable memory card, such as an SD card or a microSD card). Also, in this embodiment, the communications port 200 provides data communication to the processor 400 and power to the battery 420. As noted above, in other embodiments, the communications port 200 can provide data communication without power.

The mobile device 100 can contain different or additional components, which are not shown in FIG. 4 to simplify the drawing. For example, if the mobile device 100 is a mobile smart phone, the mobile device 100 can include hardware and/or software components to make and place telephone calls. As another example, the mobile device 100 can contain other components, such as, but not limited to, a display device (which can be touch-sensitive) and an audio output device (e.g., a speaker or a headphone jack). Of course, these are just some examples, and other implementations can be used.

Figure 5:
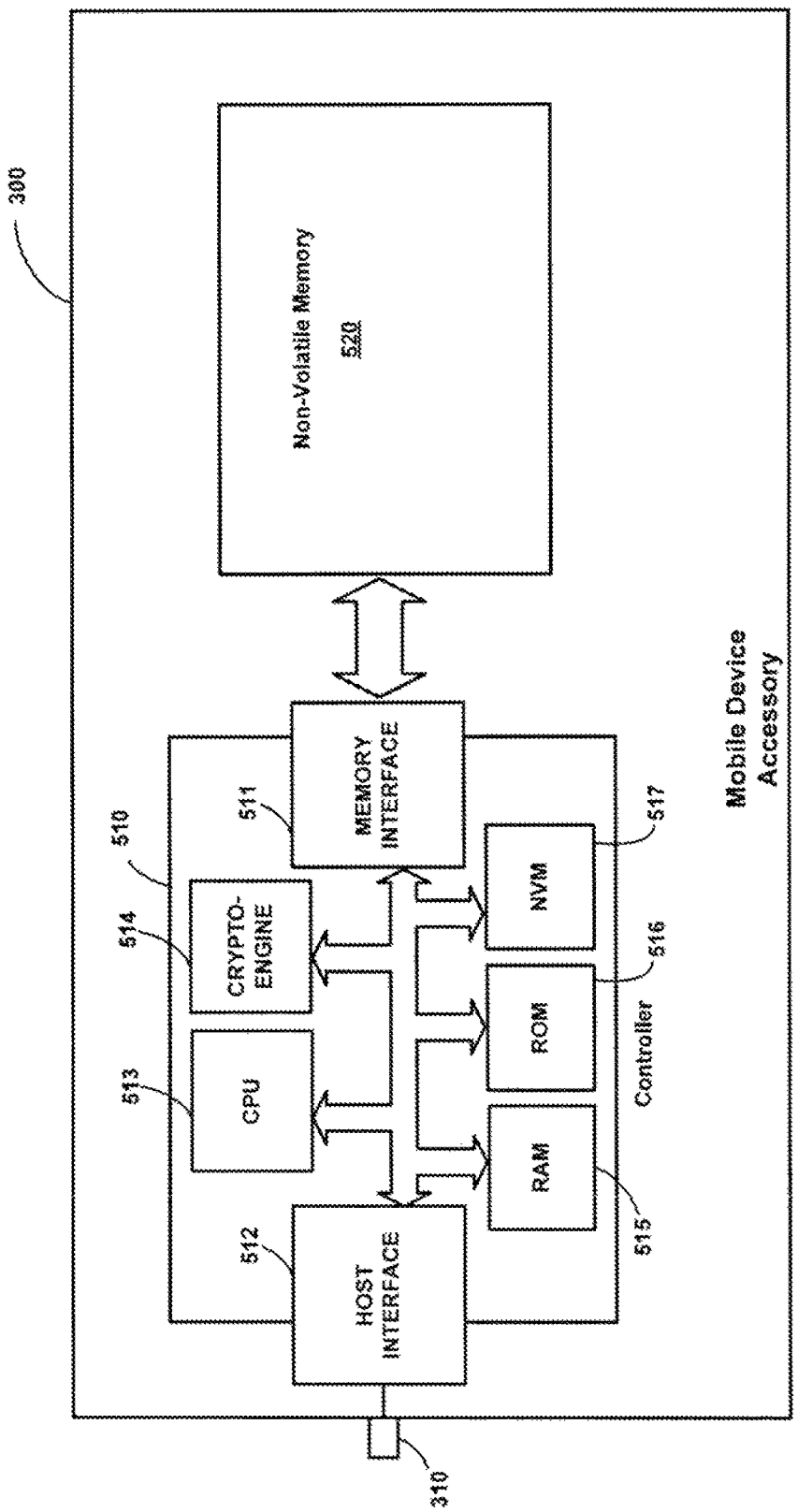
FIG. 5 is a block diagram of a mobile device accessory of an embodiment.

FIG. 5 is an illustration of a mobile device accessory 300 of an embodiment having a connector 310 that plugs-in to the communications port 200 of the mobile device 100. As mentioned above, instead of providing a mating, physical connector, the communications port 200 can be a wireless transceiver that can wirelessly communicate with the mobile device accessory 300. For example, any suitable wireless technology, now existing or later developed, can be used, including, but not limited to, 802.11 WiFi, near-field communication (NFC), Bluetooth (including Bluetooth Low Energy (LE), Nike+, ANT, ANT+, ZigBee, Radio Frequency for Consumer Electronics (RF4CE), and Infrared Data Association (IrDA).

As shown in FIG. 5, the mobile device accessory 300 in this embodiment, which here takes the form of an external storage device (as noted above, other types of accessories can be used), contains a controller 510 and non-volatile memory 520. In this embodiment, the controller 510 comprises a host interface 512 for placing the mobile device accessory 300 in communication with the mobile device 100 via the connector 310, and a memory interface 511 for placing the controller 510 in communication with the memory 520. The host interface 512 can take any suitable form, such as, but are not limited to, a SATA, SATA Express, SAS, Fibre Channel, USB, PCIe, and NVMe interface. The memory interface 511 can also take any suitable form, such as, but not limited to, a flash interface (e.g., Toggle Mode 200, 400, or 800).

The controller 510 also comprises a central processing unit (CPU) 513, an optional hardware crypto-engine 514 operative to provide encryption and/or decryption operations, read access memory (RAM) 515, read only memory (ROM) 516 which can store firmware for the basic operations of the mobile device accessory 300 and an application program interface, and a non-volatile memory (NVM) 517 which can store a device-specific key used for encryption/decryption operations, when used. The controller 510 can be implemented in any suitable manner. For example, the controller 510 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Also, some of the components shown as being internal to the controller 510 can also be stored external to the controller 510, and other components can be used. For example, the RAM 515 (or an additional RAM unit) can be located outside of the controller die and used as a page buffer for data read from and/or to be written to the memory 520.

The non-volatile memory 520 can also take any suitable form. For example, in one embodiment, the non-volatile memory 520 takes the form of a solid-state (e.g., flash) memory and can be one-time programmable, few-time programmable, or many-time programmable. The non-volatile memory 520 can also use single-level cell (SLC) or multiple-level cell (MLC). The non-volatile memory 520 can take the form of NAND Flash memory or of other memory technologies, now known or later developed.

As mentioned above, in this embodiment, the mobile device accessory 300 takes the form of an external storage device, which allows the plurality of applications running on the processor 400 in the mobile device 100 to read or write data from/to the memory 520 in the external storage device. For example, App 1 can be a media player that uses the mobile device accessory 300 to store or read audio and/or video files, App 2 can be a camera application that uses the mobile device accessory 300 to store or read photos, App 3 can be a word processing program that uses the mobile device accessory 300 to store or read documents, App 3 can be YouTube, App 4 can be Spotify, etc. A software development kit (SDK) can be provided to the manufacturer of the applications to enable the applications to communicate with the mobile device accessory 300.

In operation, an application running on the mobile device 100 sends a request via the communications port 200 to write data to or read data from the mobile device accessory 300. However, in some embodiments, the communications port 200 is configured such that only one application running on the mobile device 100 can use the communications port 200 at any given time to communicate with the mobile device accessory 300. Further, in some embodiments, the applications are "sandboxed" from each other, meaning that communication between the applications is restricted, so that one application cannot let the other know when it is using the communications port 200. So, it is possible that, when a first application is using the communications port 200 to access the mobile device accessory 300, a second application can issue a command to access the mobile device accessory 300. This may occur, for example, if the first application is loading a large file (e.g., a movie) from the mobile device accessory 300. In some embodiments, when this happens, the data transfer between the first application and the mobile device accessory 300 is interrupted in favor of the request from the second application. Likewise, the data transfer between the second application and the mobile device accessory 300 can be interrupted in favor of the request from the third application, etc. Accordingly, user attention may be required to check the occupancy of the mobile device accessory 300 by one application and later move accessory control to a new application. This can be a tedious and unwieldy process for the user if multiple applications are attempting to interact with the mobile device accessory 300.

To overcome this problem, in one embodiment, the processor 400 of the mobile device 100 is configured to synchronize requests from a plurality of applications running on the mobile device 100 to prevent one application from sending a request that would interrupt an ongoing data transfer between the mobile device accessory 300 and another application. This allows the plurality of applications running on the mobile device 100 to use the mobile device accessory 300 in an orderly fashion without requiring user intervention.

There are several ways in which to implement this synchronization. For example, one embodiment uses an application-level queue layer that is created by an application (each application has its own instance of the queue) that provides arbitration services to other applications through an operating-system-level application program interface (OS-API) but does not enforce arbitration throughout the operating environment. In this embodiment, applications may submit requests to enter the queue and are notified when the communications port 200 is available for their use. Applications cooperate with each other using this service, as any application not subscribing to the service may at any time attempt to lock the communications port 200 but has no way of knowing if the communications port 200 is available ahead of time and will not be notified when the communications port 200 is freed. Arbitration can be done in either a master-slave or a peer-to-peer manner, for example, in which the owner of the communications port 200 becomes responsible for notifying the next in line of its availability. Arbitration may be restricted to a specific accessory device. For example, the logic may be used to only arbitrate devices from a specific manufacturer or having specific characteristics.

Figure 6:
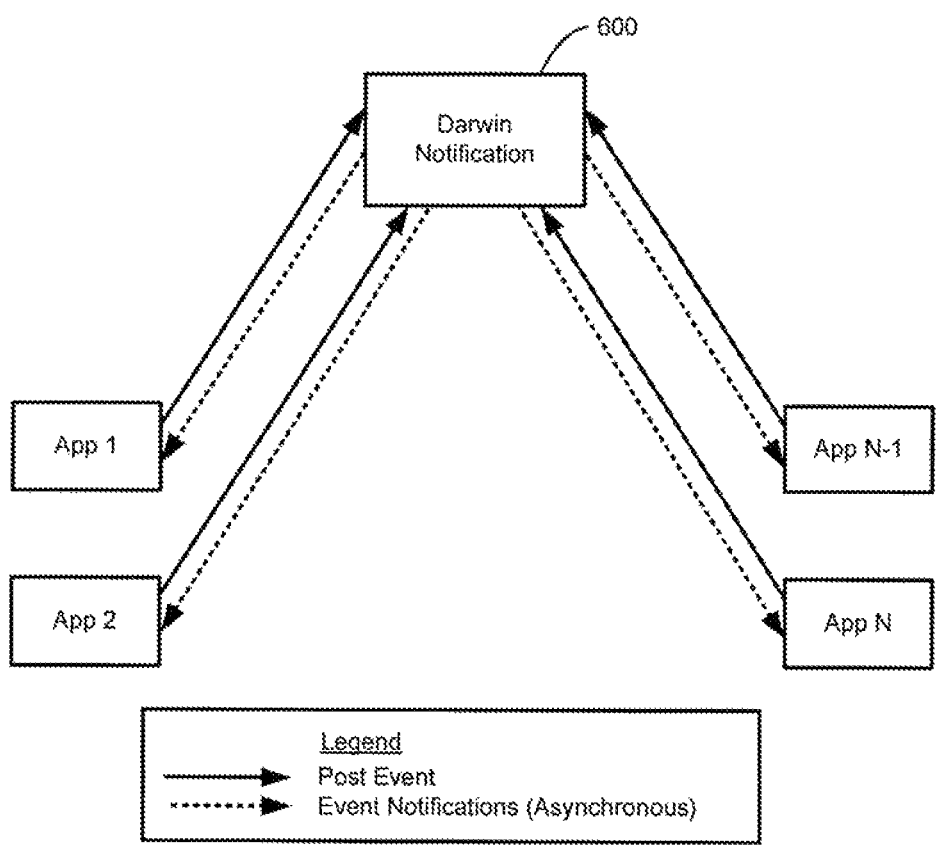
FIG. 6 is a block diagram of a plurality of applications of an embodiment communicating with a notification center.

FIG. 6 is a block diagram that will help illustrate this embodiment. In one embodiment, the application-level queue layer is part of the software development kit, and an instance of the queue is running in each application. The queue logic running in each application collects responses from all the other applications to provide arbitration. However, in this embodiment, the applications are designed so that they cannot directly communicate with each other (i.e., the applications are "sandboxed"), and the applications indirectly communicate with each other via an operating system level application program interface (API) of the mobile device 100. When the mobile device 100 is an iPhone running iOS, the Darwin Notification Center 600 can be used to allow applications to indirectly send and receive Darwin notifications from one another. As shown in FIG. 6, an application can post an event to the Darwin Notification Center 600, and, in response, the Darwin Notification Center 600 can broadcast event notifications asynchronously to the other applications. In operation, when one application is using the communications port 200, it posts that event to the Darwin Notification Center 600. The Darwin Notification Center 600 then sends out event notifications to the other applications, so they know not to attempt to use the communications port 200. When the application is done using the communications port 200, it posts an event to the Darwin Notification Center 600, and the Darwin Notification Center 600 sends out event notifications to the other applications to let them know that the communications port 200 is free.

The following is an example implementation logic using the iOS Darwin Notification Center 600. In this example, the following two APIs (part of the SDK that is integrated in each application) are used to check mobile device accessory availability across multiple applications:

(void) checkAccessoryUseFlag: (void(^) (NSUInteger*accessoryStatus)) accessoryAvailabilityCallback;

(void)unregisterAccessoryCheck;

The 'checkAccessoryUseFlag' function accepts block as the parameter. Any third party application that wants to use the mobile device accessory 300 calls this function to check availability of mobile device accessory 300. The callback function can update two different states of the accessory:

ACCESSORY_FREE=0//Accessory is free to use

ACCESSORY_WAIT=1//accessory is occupied by an application & no application is waiting for accessory ACCESSORY_BUSY=2//When accessory is in use by an application and other application waiting for accessory APP_IN_BACKGROUND=3//Application is not supposed to call accessoryCallback API in background.

Third party applications are allowed to call other accessory functions only after callback returns 'ACCESSORY_FREE'.

The 'unregisterAccessoryCheck' API will be called to release the mobile device accessory 300 to show that an application is no longer interested in application listening. Calling this API will ensure the proper cleaning of accessory logic.

The following charts show examples of messages that can be used to communicate between SDK instances of the queue running in the applications. In this embodiment, the messages can be sent via the iOS Darwin notification Center 600 with the priority as "'Real Time" delivery, and a timeout of "50 mSec" can be set to collate broadcast messages sent by other SDK instances in the applications.

Request/Update Messages

| Request/Update Messages | Description |
| --- | --- |
| GET_ACCESSORY_STATUS | This signal is broadcasted by the SDK when a third-party app calls SDK API 'checkAccessoryUseFlag'. The broadcasted messages will be received by background applications that integrated the SDK. After this message, the application will move to response listening state. |
| MSG_ACCESSORY_RELEASED | This signal is broadcasted by the SDK when an application has finished using the accessory. |

Response Messages

| Response Messages | Description |
| --- | --- |
| MSG_ACCESSORY_IN_USE | This signal is broadcasted by the SDK in response to message "GET_ACCESSORY_STATUS" if the accessory is in use by an application. |

-continued

| Response Messages | Description |
|---|---|
| MSG_ACCESSORY_WAIT1 | This message is broadcasted in response to message "GET_ ACCESSORY_STATUS" when an application is waiting for the accessory. |

In this example, checking the availability of the mobile device accessory 300 works by broadcasting notification events across iOS applications using the Darwin Notification Center 600. There is a separate event corresponding to each message, where events are identified by event name: get.accessory.status, msg.accessory.in.use, msg.accessory.released, and msg.accessory.wait1. In this example, only one application can occupy the mobile device accessory 300 at any time, and one application can remain in wait state (in other embodiments, more than one wait state can be used). When an application gets killed or wants to release the accessory 300, the application calls 'unregisterAccessoryCheck'. When an application is waken from the 'Not Running' or 'Suspended' state, the accessory accessibility logic can be to be re-initialized. For example, assume an application was in the 'WAIT' state before moving to the suspended mode. When waking up from suspended mode, the application broadcasts messages to see if it can continue in the 'WAIT' state. The 'checkAccessoryUseFlag' is the first API called in the SDK-in an application, and third party applications can call other SDK APIs only after receiving callback with accessory status 'ACCESSORY_FREE'. The 'unregisterAccessoryCheck' API can be called after closeSession as part of accessory releasing procedure. Since the logic relies upon receiving broadcast events, a 50 mSec timeout can be added in app calling 'checkAccessoryUseFlag' before returning the callback function to ensure that no pending broadcast messages exist. Data transfer can be initiated when an application is in the foreground, and the application can be moved to the background later. Upon finishing data transfer in the background, the third party application can immediately call 'unregisterAccessoryCheck' API to release the accessory 300 before the application moves to the suspended state. Other SDK APIs called will failed if the APIs are called before receiving 'Accessory FREE' callback from the 'CheckAccessoryUseFlag' API.

Figure 7:
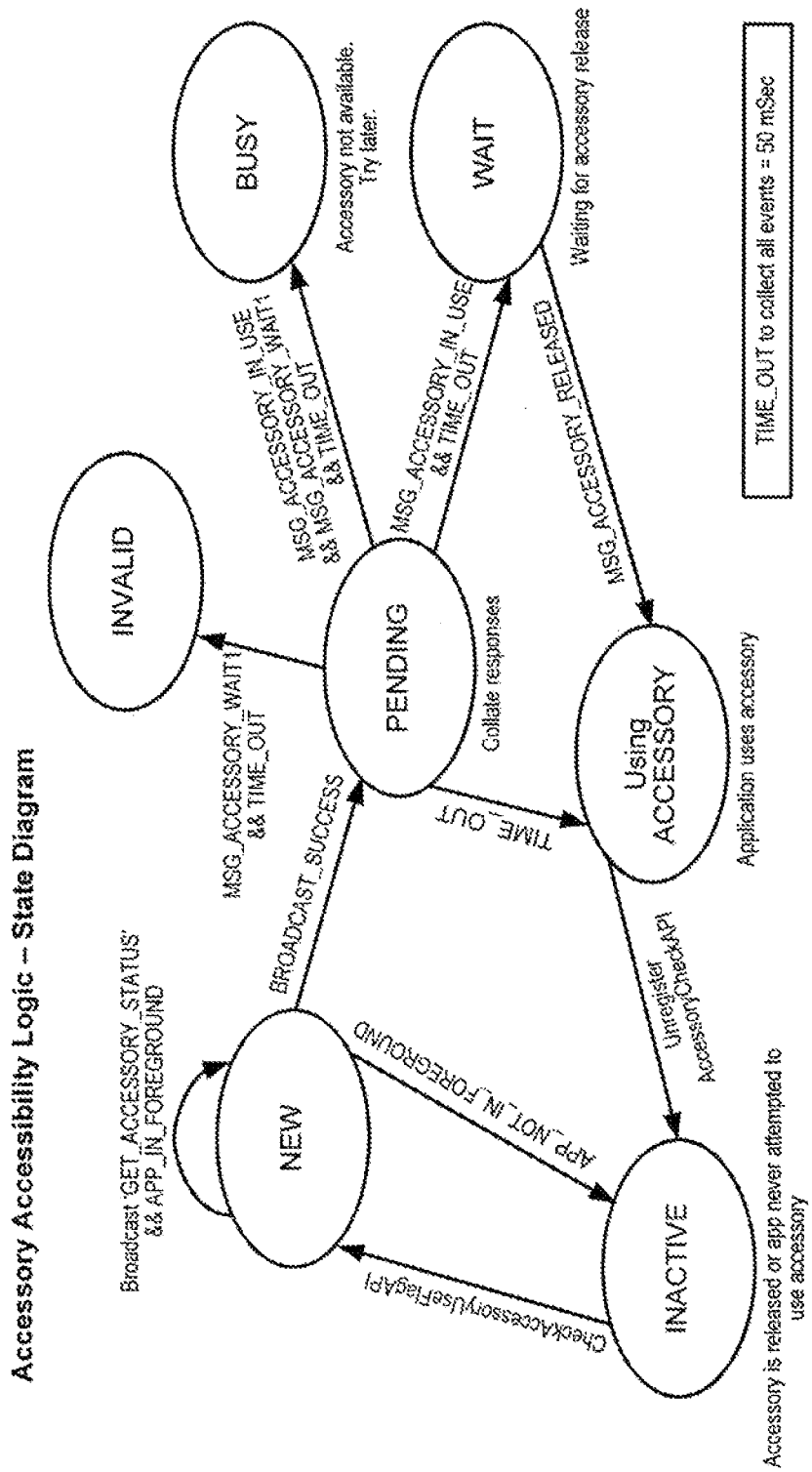
FIG. 7 is an accessory accessibility logic state diagram of an embodiment.

FIG. 7 is an accessory accessibility logic state diagram that will illustrate this embodiment. The following table describes the accessory accessibility states mentioned in that diagram:

| State | Description |
|---|---|
| NEW | Application is launched and application is about to use the SDK. Application calls SDK API 'checkAccessoryUseFlag' to check accessory availability. |
| PENDING | When 'checkAccessoryUseFlag' API is called, 'GET_ACCESSORY_STATUS' message is broadcasted. Now SDK instance waits to receive and collate response from other applications. Maximum of 50 mS is remained in the 'PENDING' state and this state is time bounded. |
| UsingACCESSORY | During 'PENDING' state, if the application doesn't receive any response from other application, application thinks that none other application uses accessory. This will allows application to use the accessory. |
| WAIT | During 'PENDING' state, if the application receives only 'MSG_ACCESSORY_IN_USE' response from other application, application thinks that other application uses accessory. This will allows application to move to 'WAIT' state. Application moves from 'WAIT' to 'READY' state when 'MSG_ACCESSORY_RELEASED' message is received later. |
| BUSY | Application cannot use accessory when 'BUSY' message is received. Application has to tryout 'checkAccessoryUseFlag' API later when no application is in 'WAIT' state. |
| INACTIVE | This state implies application has not started using accessory accessibility logic or application has quit using accessory accessibility logic. |
| INVALID | Invalid inputs received in PENDING state. This represents bug in the system and needs to be fixed. |

The following chart is an accessory accessibility states-state transition table based on the state diagram of FIG. 7:

| State | Description | I/P Event | Next State | Output |
|---|---|---|---|---|
| NEW | Application calls SDK API 'checkAccessoryUseFlag' to check accessory availability. | CheckAccessoryUseFlagAPI | PENDING | Broadcasts 'GET_ACCESSORY_STATUS' events. Moves, accessibility logic to 'PENDING' state. |
| | | APP_NOT_IN_FOREGROUND | INACTIVE | Logic moves to inactive state as app can initiate logic in foreground only. |
| PENDING | SDK instance waits to receive and collate response from other applications. 50 ms timeout to collect all events. | TIME_OUT | UsingACCESSORY | Accessory is available to use. |

-continued

| State | Description | I/P Event | Next State | Output |
|---|---|---|---|---|
| | | MSG_ACCESSORY_IN_USE & TIME_OUT | WAIT | Accessory is in use. Accessory availability will be notified later. Moves accessibility logic to 'WAIT' |
| | | MSG_ACCESSORY_WAIT1 & MSG_ACCESSORY_IN_USE & TIME_OUT | BUSY | Accessory is in use and another application waiting for accessory. Hence try to get accessory when any one of these application finishes. |
| BUSY | Accessory is in use and another application waiting for accessory. Hence in this state, application neither acquire nor wait for accessory. Application can try later. | NA | NA | Application has to try later when there is no application in wait state. |
| WAIT | Accessory is in use. Hence, application has to wait for accessory released message. | MSG_ACCESSORY_RELEASED | USINGACCESSORY | Accessory is available to use. |
| Using ACCESSORY | No other application using the accessory. Hence, accessory is free to use. | unregisterAccessoryCheck API | INACTIVE | Accessory is released and available for other apps. |
| INACTIVE | Application, has not started using accessory accessibility logic or application has quit using accessory accessibility logic | CheckAccessoryUseFlag API | NEW | Accessory accessibility logic lifecycle begins. |

Figure 8:
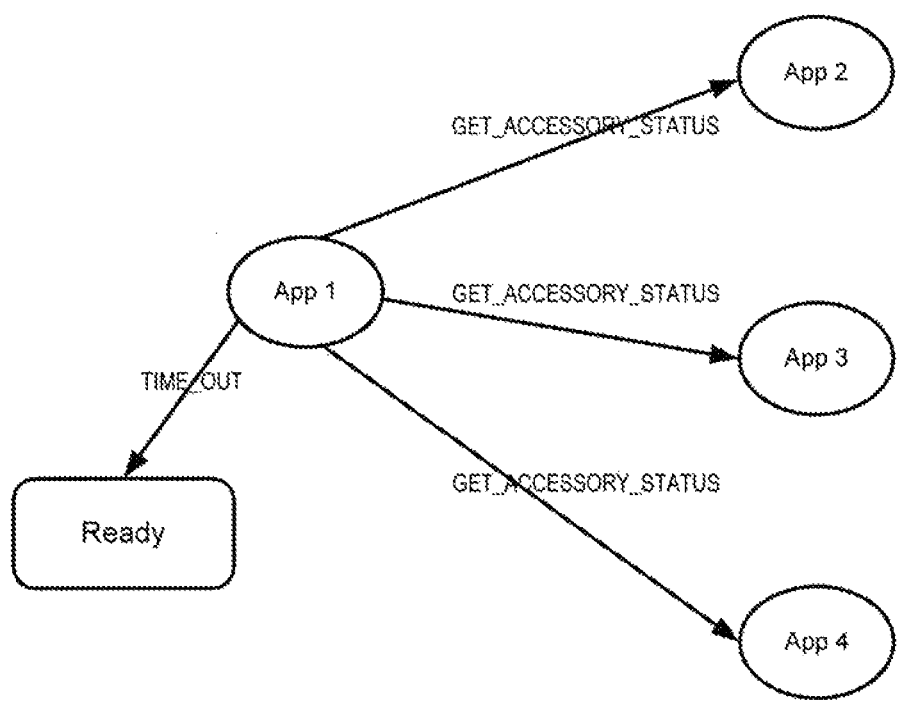
FIG. 8 is a state diagram of an embodiment in which one application requests accessory access when other applications are not using the accessory.
Figure 9:
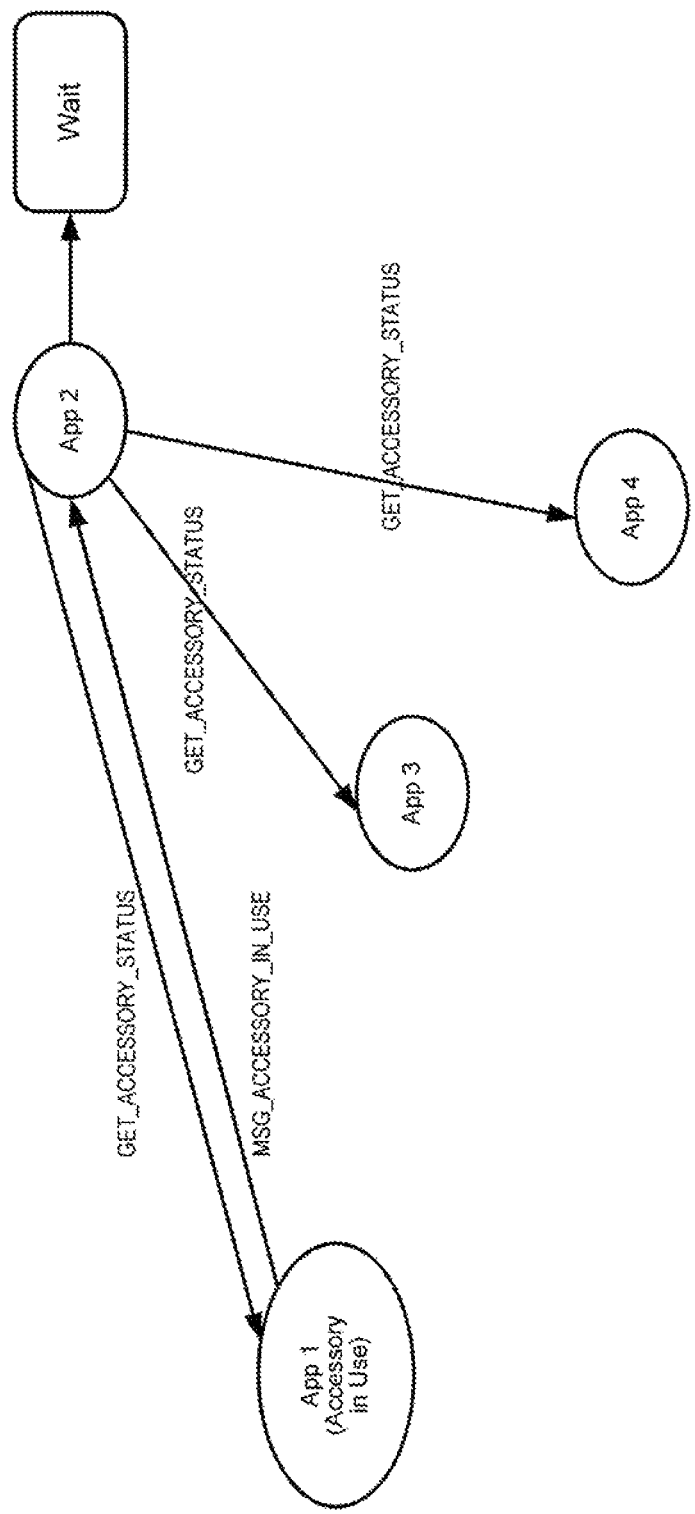
FIG. 9 is a state diagram of an embodiment in which one application requests accessory access while another application is using the accessory.
Figure 10:
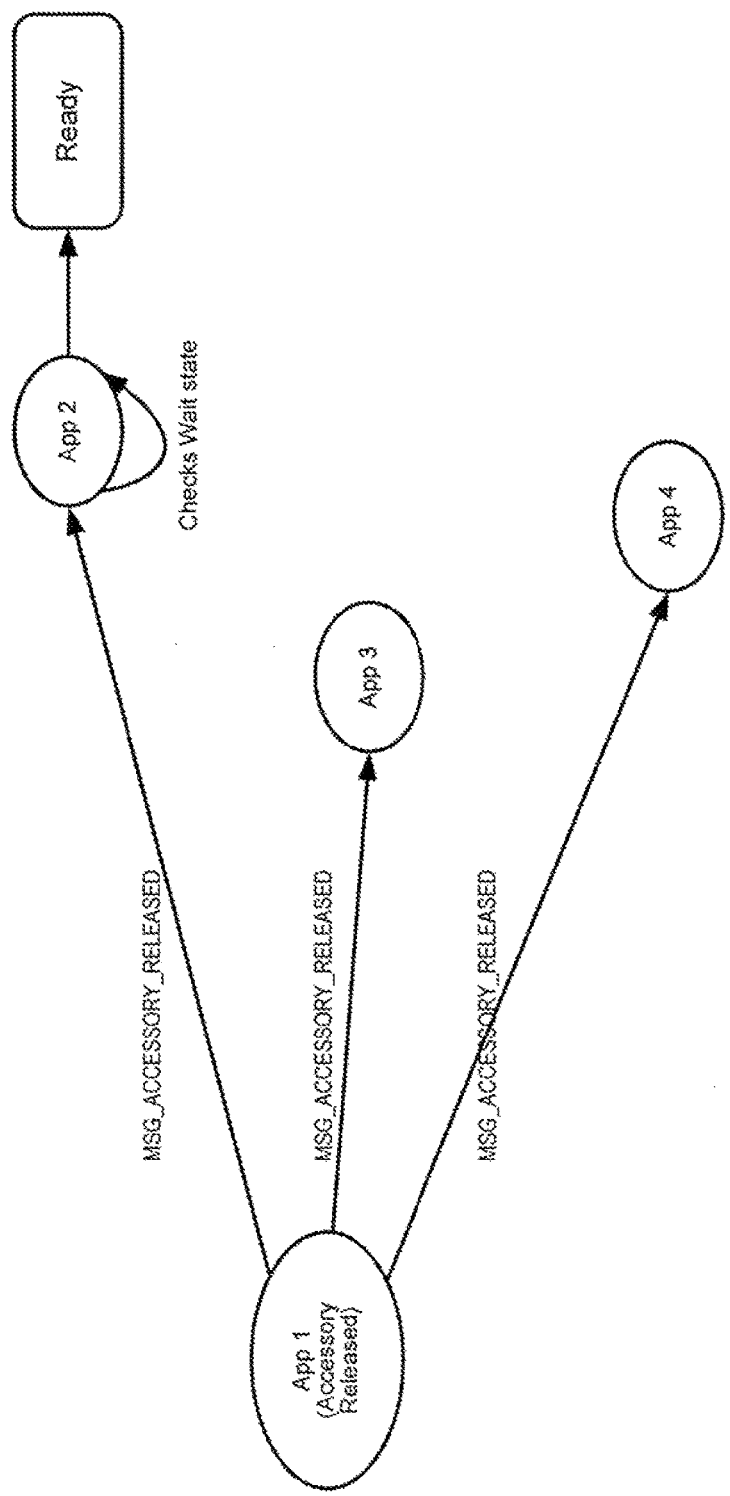
FIG. 10 is a state diagram of an embodiment in which one application releases the accessory.

FIGS. 8-10 are state diagrams that will illustrate the operation of this embodiment. In FIG. 8, App 1 wants to occupy the communications port 200. So, App 1 broadcasts a get_accessory_status message to all of the other applications. Since none of those applications are occupying the communications port 200, none of those applications respond to the message. Accordingly, after a timeout period has expired with no responses received, App 1 knows it can use the communications port 200 and moves to the ready state.

In FIG. 9, App 1 is using the communications port 200, and App 2 wants to use the communications port 200. So, App 2 broadcasts a get_accessory_status message to all of the other applications. App 1 responds that the communications port 200 is in use, and App 3 and App 4 do not reply, since they are not using the communications port 200. In response to the msg_acessory_in_use message from App 1, App 2 goes into the Wait state.

In FIG. 10, App 1 releases the use of the communications port 200, and App 2 moves from the Wait state to the Ready state and can now use the communications port 200. If there were other applications that are waiting for the communications port 200, their Wait state would be upgraded. For example, App 2 could go from the Wait 1 state to the Ready state, and the next application in line could go from the Wait 2 state to the Wait 1 state, etc.

The following is an example of code that can be used to broadcast message using a distributed notification center:

```
CFNotificationCenterRef darvinCenter =
CFNotificationCenterGetDarwinNotifyCenter( );
CFNotificationCenterPostNotification(darvinCenter,
            CFSTR(" ixpand.accessory.check "),
            NULL,
            NULL,
            true);
```

The following is an example of code that can be used to receive SDK messages over a distributed notification center:

```
static void Callback(CFNotificationCenterRef center,
            void *observer,
            CFStringRef name,
            const void *object,
            CFDictionaryRef userInfo)
{
    // Call SDK callback object
}
CFNotificationCenterRef darvinCenter =
CFNotificationCenterGetDarwinNotifyCenter( );
```

-continued

```
CFNotificationSuspensionBehavior behavior =
    CFNotificationSuspensionBehaviorDeliverImmediately;
CFNotificationCenterAddObserver(darvinCenter,
            NULL,
            Callback,
    CFSTR("ixpand.accessory.check"),
    NULL,
    behavior);
```

There are several advantages associated with these embodiments. For example, these embodiments enable multiple applications to access a mobile device accessory in a synchronized manner without user intervention. Multiple application support means that a given mobile device accessory 300 can be exposed to more users, which in turn creates more of a market for the mobile device accessory 300.

It should be noted that the above details and examples are merely of one implementation, and other implementations can be used. For example, instead of using an application layer queue running on each application, the mobile device 100 can have a queue that is external to the applications. Each application can submit a request to the queue, and the processor 400 can arbitrate the requests and determine a priority order. In yet another alternative, a token system can be used to pass control of the communications port 200 among the applications. For example, the first application entering a queue can be given the token, and only the application with the token has the right to use the communications port 200. A second application can submit a request to the queue, and, when the first application is done, it can hand the token over to the second applications. The arbitration could be a first-in-first-out system, or certain application(s) can be given priority over others.

Finally, as mentioned above, any suitable type of memory can be used. Semiconductor storage devices include volatile storage devices, such as dynamic random access memory ("DRAM") or static random access memory ("SRAM") devices, non-volatile storage devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of storage device may have different configurations. For example, flash storage devices may be configured in a NAND or a NOR configuration.

The storage devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash storage device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash storage devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single storage device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single storage device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple storage device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional storage device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) storage device levels. Alternatively, the memory elements may be coupled together to form a vertical NAND string that traverses across multiple horizontal storage device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more storage device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each storage device level of the array are typically formed on the layers of the underlying storage device levels of the array. However, layers of adjacent storage device levels of a monolithic three dimensional memory array may be shared or have intervening layers between storage device levels.

Then again, two dimensional arrays may be formed separately and then packaged together to form a non-monolithic storage device having multiple layers of memory. For example, non-monolithic stacked memories can be constructed by forming memory levels on separate substrates and then stacking the memory levels atop each other. The substrates may be thinned or removed from the storage device levels before stacking, but as the storage device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip storage device.

Associated circuitry is typically required for operation of the memory elements and for communication with the memory elements. As non-limiting examples, storage devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A mobile device comprising:
a communications port configured to connect with a mobile device accessory; and
a processor in communication with the communications port and configured to synchronize requests from a plurality of applications running on the mobile device to prevent one or more applications from sending a request that would interrupt an ongoing data transfer between the mobile device accessory and another application.

2. The mobile device of claim 1, wherein the plurality of applications cannot directly communicate with each other regarding use of the communications port, and wherein the plurality of applications indirectly communicate with each other regarding use of the communications port via an operating system level application program interface of the mobile device.

3. The mobile device of claim 1, wherein the processor is further configured to synchronize requests using an application layer queue running on each of the plurality of applications.

4. The mobile device of claim 1, wherein the mobile device accessory comprises an external storage device.

5. The mobile device of claim 1, wherein the mobile device accessory comprises at three-dimensional memory.

6. The mobile device of claim 1, wherein the mobile device comprises a smart phone.

7. The mobile device of claim 1, wherein the communications port is a wired port.

8. The mobile device of claim 1, wherein the communications port is a wireless port.

9. A method for synchronizing use of a mobile device's communications port among a plurality of applications, the method comprising:
performing the following in a mobile device comprising a communications port, wherein the communications port is configured to be used by only one application at a time:
queuing requests from a plurality of applications running on the mobile device to use the communications port;
notifying one of the plurality of applications that it can use the communications port; and
after the one of the plurality of applications is done using the communications port, notifying another one of the plurality of applications that it can use the communications port.

10. The method of claim 9, wherein each application has its own instance of a queue, and wherein queue logic running in each application collects responses from all the other applications to provide arbitration of the requests.

11. The method of claim 9, wherein the plurality of applications cannot directly communicate with each other, and wherein the plurality of applications indirectly communicate with each other via a notification center.

12. The method of claim 9, wherein the mobile device comprises a smart phone.

13. A method for synchronizing use of a mobile device's communications port among a plurality of applications, the method comprising:
performing the following in a mobile device comprising a communications port and running a plurality of applications:
sending a message from a first application to all of the other applications to request a response indicating whether any of the other applications are using the communications port;
in response to the first application not receiving any responses, moving the first application to a ready state in which it can use the communications port; and
in response to the first application receiving a response that a second application is using the communications port:
moving the first application to a wait state; and
after the second application releases the use of the communications port, moving the first application from the wait state to the ready state in which it can use the communications port.

14. The method of claim 13, wherein the plurality of applications cannot directly communicate with each other, and wherein the plurality of applications indirectly send messages and responses to one another via an operating system level application program interface.

15. The method of claim 13, wherein the first application is moved to the ready state in response to the first application not receiving any responses after a timeout period has expired.

16. The method of claim 13, wherein the mobile device comprises a smart phone.

17. A mobile device comprising:
- a communications port configured to connect with a mobile device accessory; and
- means for synchronizing requests from a plurality of applications running on the mobile device to prevent one or more applications from sending a request that would interrupt an ongoing data transfer between the mobile device accessory and another application.

18. The mobile device of claim 17, wherein the mobile device accessory comprises an external storage device.

19. The mobile device of claim 17, wherein the mobile device accessory comprises at three-dimensional memory.

20. The mobile device of claim 17, wherein the mobile device comprises a smart phone.

* * * * *